March 13, 1951  G. A. LYON  2,544,704
WHEEL COVER
Filed Dec. 12, 1947
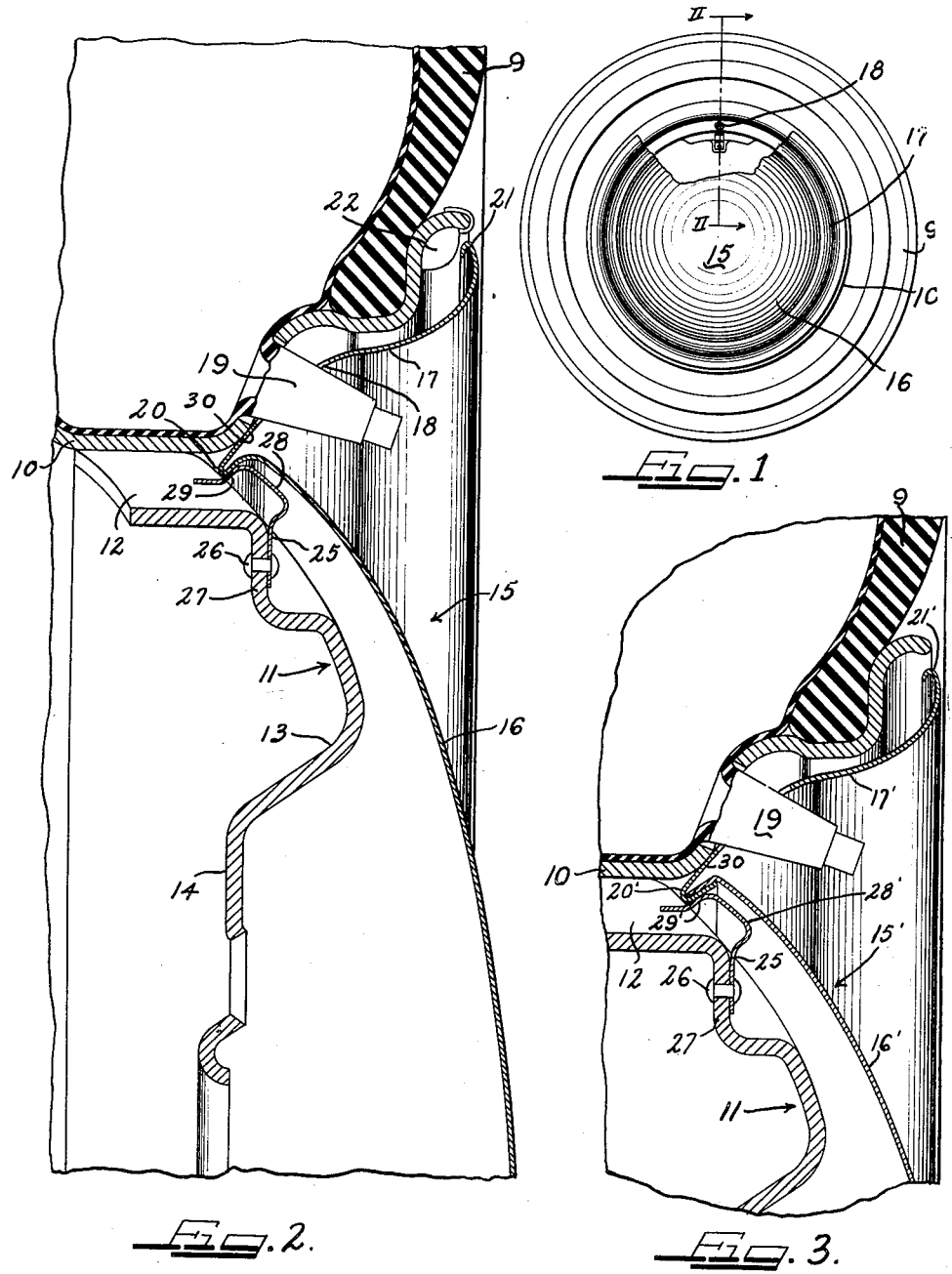
Inventor
GEORGE ALBERT LYON
The Firm of Charles W. Hills
by                              Attys.

Patented Mar. 13, 1951

2,544,704

UNITED STATES PATENT OFFICE 2,544,704

WHEEL COVER

George Albert Lyon, Detroit, Mich.

Application December 12, 1947, Serial No. 791,311

6 Claims. (Cl. 301—37)

1

This invention relates to vehicle trim and more particularly to an ornamental cover for automobile wheels.

An object of this invention is to provide in a wheel structure an improved cover and means for retaining the same on a wheel.

Yet another object of this invention is to provide a wheel cover with improved centering means which leaves the outer periphery of the cover free from engagement with the wheel so as to not interfere with the application of conventional wheel balancing weights to the wheel.

A further object of the invention relates to the provision of an intermediate inclined rib which serves the dual purpose of reinforcing the cover at the junction of its radially inner and outer portions and provides a shoulder for retaining cooperation with the retaining elements on the wheel.

A still further object of the invention relates to the provision of cover retaining means which is so located as to enable the cover to project a maximum distance into the wheel and be properly retained on the wheel.

In accordance with the general features of this invention there is provided in a wheel structure, including a wheel having a multi-flanged and shouldered tire rim part and a body part with spaced wheel openings in the body part adjacent the junction of said parts and cover retaining spring clips on the body part having outer humped extremities projecting toward the wheel openings, a circular cover member including radially outer and inner portions opposite the rim and body parts respectively with their junction formed into a turned edge opposite the openings and inclined toward the humped clip extremities for detachable engagement thereby.

Yet another feature of the invention relates to the bearing of the cover against the wheel at the base flange of the tire rim part of the wheel, the other portions of the cover being spaced away from the two parts of the wheel.

Still another feature of the invention relates to rearwardly curving the radially outer portion of the cover so that it closely follows the contour of the stepped flanges of the tire rim as well as providing it with an aperture so that it can fit over the base of the usual valve stem.

Other objects and features of this invention will more fully appear from the following detailed description taken in connection with the accompanying drawings which illustrate two embodiments thereof and in which Figure 1 is a side view partly broken away of

2 a wheel structure showing my novel cover applied thereto;

Figure 2 is an enlarged fragmentary cross-sectional view taken on substantially the line II—II of Figure 1 looking in the direction indicated by the arrows; and Fig. 3 is a fragmentary cross-sectional view similar to Figure 1 in which the cover is made of two interconnected pieces of metal instead of one piece.

As shown on the drawings:

The reference character 9 designates generally a pneumatic tire and tube assembly of conventional form. This assembly is mounted on a conventional multi-flanged and shouldered drop center tire rim 10, which comprises one part of the wheel. The other part of the wheel comprises a dished metallic stamping 11 fastened at spaced intervals in the usual manner to the base flange of the rim part, leaving spaced wheel openings 12 alternating with the points of attachment of the body part to the rim part.

The body part has a bulged central portion 13 terminating in a bolt-on central flange 14 by means of which the wheel may be attached, with bolts or cap screws (not shown) to the axle. Cooperable with this wheel is a one-piece metallic sheet cover designated generally by the reference character 15 and embodying the features of this invention. It includes radially inner and outer divergent portions 16 and 17 disposed opposite the body and rim parts, respectively, in the wheel. The radially outer portion 17 has an opening 18 through which the usual valve stem 19 of the assembly 9 projects.

It will be perceived that the portion 17 is curved so as to extend clear into the hollow between the rim and body parts of the wheel, in close proximity to the base of the valve stem, so that the valve stem can, to a certain extent, assist in centering the cover. Even if the valve stem is made of rubber, as is now a common practice, it will still assist in the centering function if engaged at its base portion where it is relatively rigid as compared to its outer extremity.

The outermost edge of the cover is turned at 21 to reinforce itself and also the turned edge 21 is spaced from the outer flange of the tire rim part so as to provide clearance for the accommodation of wheel weight 22 on the outer flange. While for the sake of illustration I have shown the wheel weight in Figure 2, it will be appreciated that usually the weight is applied at points opposite the valve stem. The conventional way of attaching the weight is to snap it over a portion of the rim edge where a counterbalancing is indicated to be necessary. Thus the cover of my invention does not in any way interfere with the customary practice of counterbalancing a wheel.

The two divergent portions 16 and 17 terminate at their junction in a turned edge 20 which is inclined both radially and axially inwardly toward spring retaining clips to be hereinafter described. This double thickness turned edge is provided by a press operation and is located so as to extend behind the inner or crowned portion 16 of the cover.

The cover is retained on the wheel by means of a plurality of spring clips which may correspond in number to the number of the wheel openings 12. They usually vary in number from three to five. Each of these clips includes a radial portion riveted at 26 to an indented shoulder 27 in the body part. Also each clip includes a hook-like outer portion 28 terminating in a humped extremity 29 over and behind which the turned edge 20 is adapted to be pressed when the cover is retained on the wheel.

It will also be perceived that the cover 15 only bears against the wheel at the base portion of the tire rim part. I have shown at 30 the radially inner margin of the portion 17 bearing against the base of the rim part in close proximity to the wheel openings 12. This point of bearing limits inward movement of the cover when it is pressed home into retaining engagement with the spring clips. It also serves to assist in centering the cover on the wheel.

The cover may be easily removed by inserting a pry off tool under the cover 21 and forcibly ejecting the cover from its engagement with the spring clips.

In Figure 3 I have illustrated a modification of the invention wherein the same numbers are employed to designate the parts common to this form and the one shown in Figure 2. The principal difference between this modification and the first described form resides in the fact that the cover 15' is made of two separate portions, 16' and 17', suitably interlocked at the intermediate turned edge 20' of the cover. The interlocking engagement is effected by lockseaming the outer and inner edges of the two portions 16' and 17'. In other words, the outer edge of the crowned portion 16' is turned into the U-shaped inner edge of the portion 17'. The parts cannot be displaced since the junction is on an incline. This incline may be effected by a suitable press operation.

Since all of the other features of this structure are the same as those in the first described form, no further description is believed to be necessary.

I claim as my invention:

1. In a wheel structure including a wheel having a multi-flanged and shouldered tire rim part and a body part with spaced wheel openings in the body part adjacent the junction of said parts, and cover retaining spring clips connected to the body part and having humped extremities projecting toward the wheel openings, a circular cover member including radially outer and inner portions opposite the rim and body parts respectively with their junction formed into a turned edge opposite the openings and inclined toward the clips for detachable engagement by the humped extremities of said clips, said radially outer cover portion being bottomed adjacent said turned edge against an inner flange of the tire rim part, and the outer edge of the cover being spaced away from an outer flange of the rim part so as to provide clearance for the disposition of a wheel weight between the edge and the tire rim part.

2. In a wheel structure including a wheel having a multi-flanged and shouldered tire rim part and a body part with spaced wheel openings in the body part adjacent the junction of said parts, and cover retaining spring clips connected to the body part and having humped extremities projecting toward the wheel openings, a circular cover member including radially outer and inner portions opposite the rim and body parts respectively with their junction formed into a turned edge opposite the openings and inclined toward the clips for detachable engagement by the humped extremities of said clips, said radially outer cover portion closely following the contour of the flanges of the rim part and being in very close proximity to the innermost flange of the rim part and being provided with a valve stem receiving aperture.

3. In a wheel structure including a multi-flanged tire rim having a side flange through which a pneumatic tire assembly valve stem projects, and a wheel body secured to the base of the tire rim and having wheel openings at spaced intervals at juncture with the tire rim, respective cover retaining spring clips secured to the wheel body at the margins defining the respective wheel openings and having humped cover retaining portions directed toward and in spaced relation to the adjacent inner portion of the tire rim with extremities of the clips extending freely into the wheel openings with which associated, a cover substantially completely enclosing the outer side of the wheel and including a central circular portion and a radially outer portion divergently related and having a generally radially and axially inwardly extending juncture formation retainingly engaged by the humped portions of the clips and with the inner margin of the outer portion of the cover bottomed by the clips against the inner portion of the tire rim inwardly of the valve stem, said outer portion of the cover extending from bottoming engagement with the tire rim closely adjacent to the flanges of the tire rim but completely spaced therefrom to adjacent the terminal flange of the tire rim and being spaced from the extremity of the terminal flange to define a wheel balancing weight enclosing chamber, said outer cover portion having an opening therein for passage of the valve stem and so related to the valve stem as to prevent turning of the cover.

4. In a wheel structure including a multi-flanged tire rim having a side flange through which a pneumatic tire assembly valve stem projects, and a wheel body secured to the base of the tire rim and having wheel openings at spaced intervals at juncture with the tire rim, respective cover retaining spring clips secured to the wheel body at the margins defining the respective wheel openings and having humped cover retaining portions directed toward and in spaced relation to the adjacent inner portion of the tire rim with extremities of the clips extending freely into the wheel openings with which associated, a cover substantially completely enclosing the outer side of the wheel and including a central circular portion and a radially outer portion divergently related and having a generally radially and axially inwardly extending juncture formation retainingly engaged by the humped portions of the clips and with the inner margin of the outer portion of the cover bottomed by the clips against the inner portion of the tire rim inwardly of the valve stem, said outer portion of the cover extending from bottoming engagement with the tire rim closely adjacent to the flanges of the tire rim but completely spaced therefrom to adjacent the terminal flange of the tire rim and being spaced from the extremity of the terminal flange to define a wheel balancing weight enclosing chamber, said outer cover portion having an opening therein for passage of the valve stem and so related to the valve stem as to prevent turning of the cover, said inner and outer cover portions being formed integrally from a single sheet of sheet metal and the juncture formation comprising an integral fold extending generally radially and axially inwardly toward the wheel body adjacent to the retaining hump of the spring clips and across the wheel openings.

5. In a wheel structure including a multi-flanged tire rim having a side flange through which a pneumatic tire assembly valve stem projects, and a wheel body secured to the base of the tire rim and having wheel openings at spaced intervals at juncture with the tire rim, respective cover retaining spring clips secured to the wheel body at the margins defining the respective wheel openings and having humped cover retaining portions directed toward and in spaced relation to the adjacent inner portion of the tire rim with extremities of the clips extending freely into the wheel openings with which associated, a cover substantially completely enclosing the outer side of the wheel and including a central circular portion and a radially outer portion divergently related and having a generally radially and axially inwardly extending juncture formation retainingly engaged by the humped portions of the clips and with the inner margin of the outer portion of the cover bottomed by the clips against the inner portion of the tire rim inwardly of the valve stem, said outer portion of the cover extending from bottoming engagement with the tire rim closely adjacent to the flanges of the tire rim but completely spaced therefrom to adjacent the terminal flange of the tire rim and being spaced from the extremity of the terminal flange to define a wheel balancing weight enclosing chamber, said outer cover portion having an opening therein for passage of the valve stem and so related to the valve stem as to prevent turning of the cover, said inner and outer cover portions comprising separate members with the juncture formation between the members comprising a flange on the inner cover member and a generally U-shaped flange on the outer cover member lock seamed together and extending generally radially and axially inwardly toward the wheel body behind the humped portions of the spring clips.

6. In a wheel structure including a multi-flanged tire rim and a wheel body comprising a stamped metal member having an annular reinforcing nose bulge and wheel openings at juncture with the tire rim, an indented shoulder on the radially outer side of the nose bulge immediately adjacent each of the wheel openings, a cover retaining spring clip secured to each of said shoulders and having a humped cover retaining portion projecting radially outwardly over the adjacent wheel opening with an extremity portion freely extending into the wheel opening, and a cover for the outer side of the wheel including a generally axially and radially inwardly extending retaining flange formation retainingly engaged by the humped portions of the clips, said cover including an annular outer portion extending into substantially concealing relation to the tire rim and engaging the tire rim at the base thereof adjacent to the wheel openings under the retaining action of the spring clips.

GEORGE ALBERT LYON.

REFERENCES CITED

The following references are of record in the file of this patent:

UNITED STATES PATENTS

| Number | Name | Date |
| --- | --- | --- |
| Re. 22,119 | Lyon | June 16, 1942 |
| Re. 22,120 | Lyon | June 16, 1942 |
| 2,162,732 | Lyon | June 20, 1939 |
| 2,239,367 | Lyon | Apr. 22, 1941 |
| 2,343,070 | Lyon | Feb. 29, 1944 |